United States Patent [19]
Heitland et al.

[11] 3,854,288
[45] Dec. 17, 1974

[54] ARRANGEMENT FOR EXHAUST GAS CLEANING

[75] Inventors: Herbert Heitland; Peter Manderscheid, both of Wolfsburg, Germany

[73] Assignee: Volkswagenwerk Aktiengesellschaft, Wolfsburg, Germany

[22] Filed: June 12, 1972

[21] Appl. No.: 262,008

[30] Foreign Application Priority Data
June 11, 1971 Germany............................ 2129023

[52] U.S. Cl. ............... 60/300, 23/277 C, 23/288 F, 60/284, 60/286, 60/301, 60/303
[51] Int. Cl. ......................... F01n 3/14, F02b 75/10
[58] Field of Search ............ 60/274, 286, 303, 299, 60/301, 289, 300, 284; 23/277 C, 288 F

[56] References Cited
UNITED STATES PATENTS

| | | | |
|---|---|---|---|
| 3,013,628 | 12/1961 | Jacobs | 23/288 F |
| 3,066,755 | 12/1962 | Diehl | 60/303 |
| 3,166,895 | 1/1965 | Slayter | 23/288 F |
| 3,220,179 | 11/1965 | Bloomfield | 23/288 F |
| 3,228,746 | 1/1966 | Howk | 60/301 |
| 3,380,810 | 4/1968 | Hamblin | 60/299 |
| 3,404,965 | 10/1968 | Shiller | 23/288 F |
| 3,544,264 | 12/1970 | Hardison | 23/288 F |
| 3,644,098 | 2/1972 | Palma | 60/295 |
| 3,804,597 | 4/1974 | Inoue | 23/288 |

Primary Examiner—Douglas Hart
Attorney, Agent, or Firm—Ernest F. Marmorek

[57] ABSTRACT

A combustion engine emitting an exhaust gas in the process of its operation having a cleaning arrangement for cleaning the exhaust gas, such cleaning arrangement having a thermal reactor for oxidizing the components in the exhaust gas and a first catalyzer placed upstream with respect to the flow of the exhaust gas before the thermal reactor for performing a reduction of the components in the exhaust gas, the catalyzer having a hollow body surrounding the thermal reactor, a housing for receiving the catalyzer and the thermal reactor, the catalyzer forming with the housing a chamber, and an input conduit for the exhuast gas terminating in such chamber.

9 Claims, 1 Drawing Figure

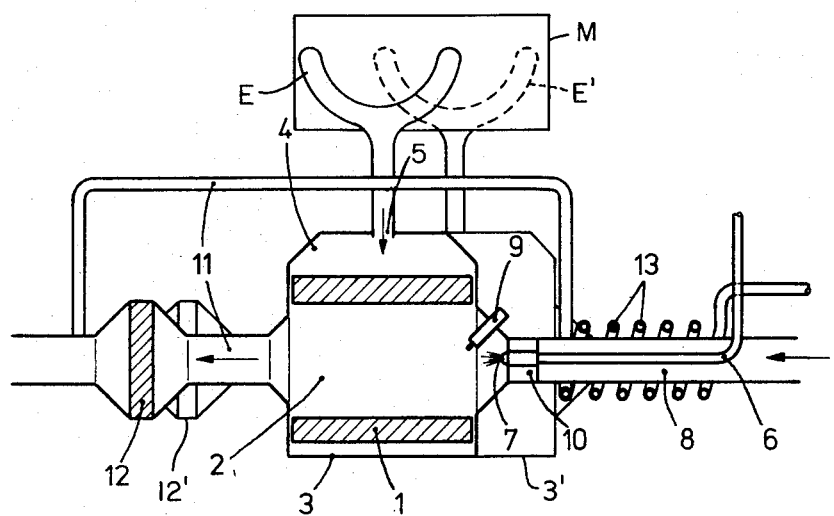

ARRANGEMENT FOR EXHAUST GAS CLEANING

CROSS-REFERENCE TO OTHER APPLICATIONS

Reference should be had to copending application of Peter Manderscheid entitled Combustion Engine With At Least One Exhaust Gas Cleaning Arrangement Ser. No. 262,006 filed June 12, 1972; to the copending application of Reinhard Gospodar entitled Combustion Engine With At Least One Exhaust Gas Cleaning Arrangement Ser. No. 262,007 filed June 12, 1972; to the copending application of Herbert Heitland and Peter Manderscheid entitled Arrangement For Cleaning Exhaust Gas In Motor Vehicles Ser. No. 262,005 filed June 12, 1972, all filed concurrently herewith and being assigned to the same assignee as the present application.

FIELD OF THE INVENTION

The present invention relates to an arrangement for cleaning the exhaust gas especially in motor vehicles, such arrangement including a preferably heated thermal reactor for the oxidation of the gas components and a first catalyzer lying upstream with respect to the reactor for reducing the components in the exhaust gas.

BACKGROUND OF THE INVENTION

Such devices are known from German OLS (laid-open application) 1,921,024.

The difficulty encountered with the exhaust gas cleaning arrangement having the catalyzer described in the above-mentioned literature resides in that the catalyzer attain their full operating efficiency only after they have reached a certain minimum temperature, which means, that they can operate only in a more or less limited fashion right at the beginning of the operation of the combustion engine whch is very critical phase, the cold starting phase. Therefore, they are incapable of cleaning the exhaust gases during that stage. One may say that the emission of hydrocarbons and carbon monoxides at the cold starting of the engine takes up about 80 percent of the total of those emitted gases which are still permissible under the present law. From this follows that the thermal relationship in such cleaning arrangement deserve a close attention especially during the cold start of a combustion engine.

SUMMARY OF THE INVENTION

It is, therefore, an object of the present invention to provide an improved catalytic-type exhaust gas cleaning arrangement which eliminates the difficulties encountered with hitherto known devices.

According to the present invention the first catalyzer is constructed as an annular body surrounding the thermal reactor and which with a common housing forms an annular chamber surrounding it and into which there is at least one input conduit for the exhaust gases.

The fact that the first catalyzer is constructed as an annular body surrounding the thermal reactor has its benefit in that it offers a good thermal insulation for the thermal reactor which will be heated to a temperature above 800°C and, at the same time, the catalyzer gets quickly heated up to its operational temperature by the thermal reactor itself. It should be noted that the annular formation of the first catalyzer does not necessarily means that its cross section must be always an annulus. It should be rather broadly understood as being a body which has a hollow inside adapted to receive the thermal reactor therein. Consequently, the cross-section of such hollow body can be, for example, a polygon, or even a square.

When during the cold start only a slight amount of nitrogen components is present in the exhaust gas and, consequently, the first catalyzer does not really have to have its full reduction capability yet, a heating up of the catalyzer during this period has its advantage in that as long as there will be oxygen parts in the exhaust gas, it can perform the oxidation of the carbon monoxides and of the hydrocarbons even at higher temperatures.

According to the present invention the thermal reactor is provided with a fuel supply, a secondary air supply constituting a heating arrangement having a glow or spark plug therein which will be placed together with the first catalyzer into the housing forming the cylinder chamber at one end of which the inputs to the heating arrangement terminate while at the other end thereof the output of the cleaned gas is joined.

The glow or spark plug will be coupled with the electrical power unit of the combustion engine so that at the instant of the starting of the engine an ignition of the fuel and its mixture with the secondary air in the heating arrangement will take place. For example, the spark plug can be connected into the electrical circuit of the spark plugs of the engine itself. The secondary air input to the heating arrangement should be constructed according to the present invention in such a manner that there is an air quantity supplied which is not only sufficient for the combustion of the fuel supplied to the thermal reactor but it is also sufficient to carry out the oxidation reaction of the components in the exhaust gas within the reactor.

The thermal reactor, therefore, requires for its operation a continuous supply of energy in the form of a fuel and electrical energy to operate the glow or sparkplug. It is, therefore, preferred that the exhaust gas conduit contains also a second catalyzer for the oxidation of the components in the exhaust gas. This catalyzer will become operational only when it reaches its operating temperature under the influence of the hot exhaust gases. The advantage of the fired thermal reactor can be seen, therefore, in that it offers the possibility of oxidation of the components in the exhaust gas in the interval between the starting of the combustion engine and between the reaching by the second catalyzer its operation temperature, while during the rest of the operation it can be shut off. It is also possible that the thermal reactor will remain in the process continuously since it can perform a preliminary cleaning of the exhaust gas with respect to its components susceptible to oxidation and in such a case the second catalyzer must be constructed only to take care of the remaining part of the cleaning process.

The construction of the first catalyzer as an annular body according to the present invention and to which the exhaust gas is supplied at the periphery thereof, has its advantages not only with respect to the thermal relationships created within the cleaning arrangement but also in that the exhaust gas quantity is distributed over various regions of the first catalyzer. Consequently, it becomes possible to use a much smaller catalyzer body and, at the same time, with a much smaller catalyzer body a longer operational life can be attained.

The temperature of the exhaust gas present in the exhaust gas conduits is due not only to the sensible or natural heat of the exhaust gases themselves as determined by their state as they leave the combustion space of the engine, but also is due to the heat generated by the reactions taking place in the catalyzer and in the thermal reactor. For this reason it is especially advantageous, as explained in connection with another aspect of the present invention, that the exhaust gas conduit is constructed to have a region which effects the heating up of the secondary air supplied to the arrangement.

BRIEF DESCRIPTION OF THE DRAWING

The invention will become more readily apparent from the following description of a preferred embodiment thereof shown, by way of example, in the accompanying drawing, in which:

The single FIGURE is an illustration of the exhaust gas cleaning arrangement according to the present invention, in side view, partly in section.

DESCRIPTION OF THE PREFERRED EMBODIMENT

As seen in the single FIGURE the exhaust gas cleaning arrangement comprises a first catalyzer 1 for illustrating purposes formed as an annular body, however, as pointed out above it can be generally hollow in shape and have a cross section other than annulus, and a thermal reactor 2 surrounded by the first catalyzer 1. Both the first catalyzer and the thermal reactor 2 are placed in a common housing 3 which with its outer shell forms in conjunction with the first catalyzer 1 an annular chamber 4 into which the exhaust gas is supplied by an input conduit 5. The first catalyzer 1 comprises a material which is capable of performing a reduction of the nitrogen components in the exhaust gas, however, at higher temperatures it is also capable to oxidize the carbon monoxides and the hydrocarbons in the exhaust gas. For example, such first catalyzer 1 can be in the form of a granulated material which is placed over a perforated plate, or in the form of a wire mesh which is covered by a substance capable of acting as a catalyzer, or in the form of a ceramic body which is activated to perform as a catalyzer. The input of the exhaust gas to the first catalyzer 1 by means of the annular chamber 4 creates a uniform supply or loading of the various regions of the first catalyzer 1.

The thermal reactor 2 comprises a heating arrangement which has a fuel supply conduit 6 and an injection nozzle 7, a secondary air supply conduit 8 and a glow or sparkplug 9. The sparkplug 9 is connected into the electrical circuit of the sparkplug of the combustion engine, which itself is not shown, so that is will ignite, for example, simultaneously with the sparkplugs of the engine, or can be delayed in time. Due to the burning of the flame, as a result of the ignition of the fuel mixture with the secondary air supplied, there will be an oxidation of the exhaust gas components taking place even at the cold state of the thermal reactor 2 and even at the cold state of the catalyzer 1. The heating up of the thermal reactor 2 as well as of the first catalyzer 1 will take place very rapidly according to the arrangement of the present invention, since the catalyzer 1 will act as a heat insulator to the thermal reactor 2 by surrounding it and, on the other hand, due to the surrounding construction, the catalyzer 1 itself becomes quickly heated up by the thermal reactor 2.

The secondary air supply conduit 8, into which as indicated at 10, swirl vane can be placed, is constructed and dimensioned in such a manner that it is capable of delivering sufficient quantity of air which in addition to the air requirement for the combustion of the fuel supplied by nozzle 7 will be also sufficient for performing the various reactions of the exhaust gas components taking place in the catalyzer 1 and in the thermal reactor 2.

The input conduits 6 and 8 as can be seen in the FIGURE are led to the right end plate of the housing 3 while at the left hand plate of the housing 3 the exhaust gas output conduit 11 is provided. Into the output conduit 11 a second catalyzer 12 is coupled which is capable of cleaning or scrubbing the exhaust gas from its carbon monoxide and hydorcarbon components. The second catalyzer 12 becomes fully operational only when the hot exhaust gas will heat it up to its operational temperature. One may therefore provide for an alternating of the operation between the thermal reactor 2 on one hand and between the second catalyzer 12, so that during the starting up of the combination engine and, when the second catalyzer 12 is still cold, the thermal reactor 2 will perform the operation while subsequently the second catalyzer 12 will take over the oxidation process after it became heated up. This may be important from view point of energy conservation since for the thermal reactor 2 one would require to supply the energy in a continuous fashion. If, however, desired, the thermal reactor 2 can be kept constantly operational so that the second catalyzer 12 receives the exhaust gas in a precleaned state. In the illustrated embodiment the exhaust gas conduit 11 has a return branch 11 behind or downstream with respect to the second catalyzer 12 so that the exhaust gas conduit 11 is used to provide a heat exchanging region 13 for the secondary air supply conduit 8. The return branch 11 can be exhausted to the atmosphere as shown, or returned back to the main conduit 11 downstream. Such preheating of the secondary air will aid the heating up of the thermal reactor 2 as well as of the first catalyzer 1 so that they will reach quicker their operational temperatures. Obviously, the last mentioned arrangement benefits not only the heating of the catalyzer 1 and thermal reactor 2 but also the heating up of the second catalyzer 12 to its operational temperature. The second catalyzer 12 has its advantage in that it performs an after burning of the output of the heating arrangement of the thermal reactor 2 in the event such burning has not been completed already in the thermal reactor 2.

In case of a four cylinder engine of the boxer type one would place a pair of the above-described cleaning arrangement around the engine and, more particularly, one for each cylinder pair. According to the ignition sequence of the combustion engine both cylinders of each engine emit the exhaust gases one after the other which then, if the thermal reactor 2 is constructed to be sufficiently large, will spend sufficiently long time, namely about 360°KW, in the thermal reactor 2, so that even in the case of low reactor temperatures, that is, during the start-up phase of the engine, by spending a relatively long time in the thermal reactor 2, a complete reaction of the cleaning process is assured.

As shown in the drawing the present invention is adapted for use with an internal combustion engine M having a plurality of exhaust manifolds such as designated by the reference characters E and E'. The manifold E cooperates with the two cylinders of the engine M that are on the side of the engine facing the viewer whereas the manifold E' cooperates with the two cylinders of the engine M that lies behind the plane of the drawing. The exhaust manifold E' is in fluid flow communication with a housing 3', which housing has a structure corresponding to that of the housing 3 and, in the same manner, contains a combustion chamber as well as a catalyzer. In the direction in which the exhaust gases flow, the second cylinder 12' is situated beyond the housing 3' which contains the first catalyzer and the combustion chamber. Feed and discharge lines for different media are also associated with the second housing 3'. Since the feed and discharge lines of the second housing 3' coincide with the corresponding feed and discharge lines for the housing 3 which lie directly in front, they are not illustrated.

The term "KW" as used hereinabove, is an abbreviation for the German term "Kurbelwellenwinkel" which represents the crank shaft angle. As used herein the crank shaft angle is defined as the angle between the position of the crank shaft at a given time and the position the crank shaft assumes when a piston is in its upper dead center position. In this upper dead center position of the piston, the crank shaft angle is defined as zero degrees and all other piston positions are automatically correlated with an assigned crank angle.

I wish it to be understood that I do not desire to be limited to the exact details of construction shown and described for obvious modifications will occur to a person skilled in the art.

Having thus described the invention, what I claim as new and desire to be secured by Letters Patent, is as follows:

1. A combustion engine emitting an exhaust gas in the process of its operation comprising a cleaning arrangement for cleaning the exhaust gas, said cleaning arrangement comprising a thermal reactor for oxidizing the components in the exhaust gas and a first catalyzer placed upstream with respect to the flow of exhaust gases before the thermal reactor for performing a reduction of the components in the exhaust gas, said first catalyzer comprising a hollow body surrounding said thermal reactor, a housing for receiving said first catalyzer and said thermal reactor, said first catalyzer forming with said housing a chamber, and an input conduit for the exhaust gases terminating in said chamber, said thermal reactor comprising a heating arrangement including a fuel supply, a secondary air supply and sparkplug means for igniting the fuel and air mixture supply to said thermal reactor, said heating arrangement being placed adjacent an end wall portion of said housing into which said thermal reactor and said first catalyzer are placed, said housing comprising another end wall portion including an exhaust gas output conduit.

2. The cleaning arrangement as claimed in claim 1, further comprising a second catalyzer coupled to said output conduit for oxidizing the components in said exhaust gas.

3. The cleaning arrangement as claimed in claim 1, wherein said output conduit of said exhaust gas comprising a feedback portion arranged for preheating the secondary air input to said thermal reactor.

4. The cleaning arrangement as claimed in claim 2, for use with a four cylinder engine, said cleaning arrangement being used with two of said cylinders of said four cylinder engine and another cleaning arrangement is placed for operation with the other pair of cylinders.

5. The cleaning arrangement as claimed in claim 1, wherein said catalyzer body is an annular body surrounding said thermal reactor and said catalyzer forming an annular chamber with said housing for enabling the exhaust gas to be uniformly distributed over said first catalyzer.

6. A cleaning arrangement for cleaning the exhaust gas coming from a combustion engine, said cleaning arrangement comprising a thermal reactor for oxidizing the components in the exhaust gas and a first catalyzer placed upstream with respect to the flow of exhaust gases before the thermal reactor for performing a reduction of the components in the exhaust gas, said first catalyzer comprising a hollow body surrounding said thermal reactor, a housing for receiving said first catalyzer and said thermal reactor, said first catalyzer forming with said housing a chamber, and an input conduit for the exhaust gases terminating in said chamber, said thermal reactor comprising a heating arrangement including a fuel supply, a secondary air supply and sparkplug means for igniting the fuel and air mixture supply to said thermal reactor, said heating arrangement being placed adjacent to an end wall portion of said housing in which said thermal reactor and said first catalyzer are placed, said housing comprising another end wall portion including an exhaust gas output conduit.

7. The cleaning arrangement as claimed in claim 6, further comprising a second catalyzer coupled to said output conduit for oxidizing the components in said exhaust gas.

8. The cleaning arrangement as claimed in claim 6, wherein said output conduit of said exhaust gas comprises a feedback portion arranged for preheating the secondary air input to said thermal reactor.

9. The cleaning arrangement as claimed in claim 6, wherein said catalyzer body is an annular body surrounding said thermal reactor and said catalyzer forming an annular chamber with said housing for enabling the exhaust gas to be uniformly distributed over said first catalyzer.

* * * * *